United States Patent [19]

Gatto et al.

[11] Patent Number: 5,050,986
[45] Date of Patent: Sep. 24, 1991

[54] SYNCHRONIZATION SYSTEM FOR CONTROLLING SWITCHES

[75] Inventors: Anthony J. Gatto, Chandler; Randy L. Dahl, Mesa; John A. Muir, Phoenix, all of Ariz.

[73] Assignee: Motorola, Inc., Schaumburg, Ill.

[21] Appl. No.: 533,308

[22] Filed: Jun. 5, 1990

[51] Int. Cl.$^5$ .......................... G01C 3/08; G01S 13/00
[52] U.S. Cl. ........................................ 356/5; 342/94; 342/198; 342/205; 367/903
[58] Field of Search .......................... 342/94, 198, 205; 367/903; 356/5

[56] References Cited

U.S. PATENT DOCUMENTS

| | | | |
|---|---|---|---|
| 3,278,753 | 10/1966 | Pitts et al. | 356/5 |
| 3,545,861 | 12/1970 | Farnsworth et al. | 356/5 |
| 3,689,156 | 9/1972 | Kerpchar | 356/5 |
| 3,941,483 | 3/1976 | Ferrin | 356/5 |
| 4,521,107 | 6/1985 | Chaborski et al. | 356/5 |

Primary Examiner—Stephen C. Buczinski
Attorney, Agent, or Firm—Robert M. Handy; Maurice J. Jones

[57] ABSTRACT

An optical ranging system includes optics that create a backscatter signal in response to a transmitted light pulse. The transmitted pulse is reflected from a target to provide range information. The backscatter signal is applied to trigger a threshold detector. The output of the threshold circuit is applied to a delay circuit to provide a receiver switch control signal which renders a receiver switch conductive after the backscatter signal. Accordingly, the receiver switch blanks the backscatter signal and applies the reflected signal to the receiver.

19 Claims, 3 Drawing Sheets

SYNCHRONIZATION SYSTEM FOR CONTROLLING SWITCHES

BACKGROUND OF THE INVENTION

The present invention relates in general to control of switches which must not be simultaneously conductive and particularly to the transmit/receive switches for ranging systems.

Laser Infrared Detection and Ranging (LIDAR) systems measure the time between transmission of a pulse of light and the reflection thereof by a target to determine the distance between the light transmitter/receiver and the target. Some LIDAR systems utilize common optical apertures wherein optical elements along the same axis are shared by the transmitter and receiver. Unfortunately, significant quantities of transmitter energy are coupled or reflected into the receiver system by the pulse being transmitted as a result of "backscatter" from these optical components. This backscatter can cause overload and saturation of the receiver during which the system is blind to near-range targets. To minimize this effect, a Transmit/Receive (T/R) switch is used to isolate the receiver from the common optical path during the transmitted pulse duration. The detection of near-range targets requires accurate synchronization of the T/R switch operation with the transmitted pulse. The receiver must be isolated from the common path only long enough to prevent saturation by the backscatter and then reconnected quickly to assure detection of the returning pulse from close range targets. Such return pulses become closer in time to the transmitted pulse as the target range decreases.

In some prior art systems, T/R switch operation is timed by inserting a fixed delay between the transmitter trigger event and the switch control signal. This receiver blanking interval generally equals the sum of the electrical delay inherent in the transmitter firing circuitry, the transmit duration, and the propagation time during which the reflected optical backscatter might have a deleterious effect on the receiver. In practice, the electrical delay in the transmitter firing circuitry between trigger initiation and the transmitter output pulse can change significantly due to temperature shifts and component variations. A blanking interval that is too short allows overload of the receiver resulting in saturation and long recovery times. Alternatively, a blanking interval that is too long undesirably reduces close range target detection. Hence, the blanking interval is usually set for the longest or worst case delay encountered between trigger initiation and actual transmitter firing over temperature extremes. This results in a sacrifice of near range target detection since the blanking interval and the resulting receiver inactive period will usually be longer than required by the actual firing circuit delay during normal operation at more usual temperatures, for instance.

Another prior art approach requires duplication of the transmitter circuitry requiring compensation. The duplication circuitry is installed in a parallel receiver path requiring synchronization. Assuming similar temperature characteristics in the two paths, the variations in the transmitter firing circuitry are nullified. Also, circuitry with a suitable temperature coefficient can be combined with an adjustable delay generator to track and compensate for temperature induced variations and propagation delay. These prior art approaches while viable in some applications are too complex and costly for other applications.

As previously explained, it is desirable for the T/R switch to be nonconductive during the undesirable backscatter pulse so that the receiver is isolated from the backscatter pulse. This prevents electrical saturation and/or overload of the receiver. An undesirable characteristic of some prior art T/R switches is that they tend to conduct transients to the receiver when switching or when rendered nonconductive. These transients can be induced by the T/R switching control signals. This problem is particularly acute in high power systems using sensitive receivers. The transients can render the system blind to targets until the receiver has recovered therefrom. The undesirable transient feedthrough is a result of the inherent electrical capacitance resistance and/or inductance present in the switching semiconductors and package comprising the T/R switch. Prior art transient suppression is usually accomplished by using a passive network or an active device to absorb or limit the transient energy impulse. These techniques can degrade the signal of interest if the transient has its energy distribution within the time domain response of the system being protected.

SUMMARY OF THE INVENTION

One object of the present invention is to provide circuitry for synchronizing T/R switches with transmitter operation while providing automatic compensation of timing shifts due to temperature and component variation.

Briefly, one embodiment of the invention can be used in an optical ranging system including common aperture optics for transmitting and receiving a pulse of light having a predetermined duration. The system is suitable for measuring the time between the transmitted light signal and a light signal reflected by a target to determine the range of the target. The common aperture optics create a backscatter signal substantially coincident with the transmitted signal. The transmitted signal is sent after an unpredictable amount of delay from the occurrence of an initiation signal. Receiver switch circuitry is adapted to be insensitive to the undesirable delay and includes a receiver switch providing a conductive path in response to a switching control signal. A photodetector is coupled to the common aperture optics for providing the backscatter and reflected electrical signals which are substantially coincident with the backscatter and primarily to detect the reflected light signals. A comparator, which is coupled to the photodetector, provides an output signal in response to the backscatter electrical signal exceeding a predetermined threshold of the comparator. A delay circuit is coupled between the comparator and the receiver switch. The delay circuit provides the switching control signal in response to the comparator output signal after a delay approximating the predetermined duration of the transmitted pulse so that the receiver switch is operated to provide the conductive path before the occurrence of the reflected signal but after the backscatter signal. This enables the reflected signal to be provided through the conductive path of the switch. A receiver is coupled to the switch for processing the reflected signal to determine the range of the target. The system can further include a shunt switch for shunting the backscatter signal away from the receiver and a latch for controlling the receiver and shunt switches.

The above and other objects, features, and advantages of the present invention will be better understood from the following detailed description taken in conjunction with the accompanying drawings.

DETAILED DESCRIPTION OF THE PREFERRED EMBODIMENT

Figure 1:
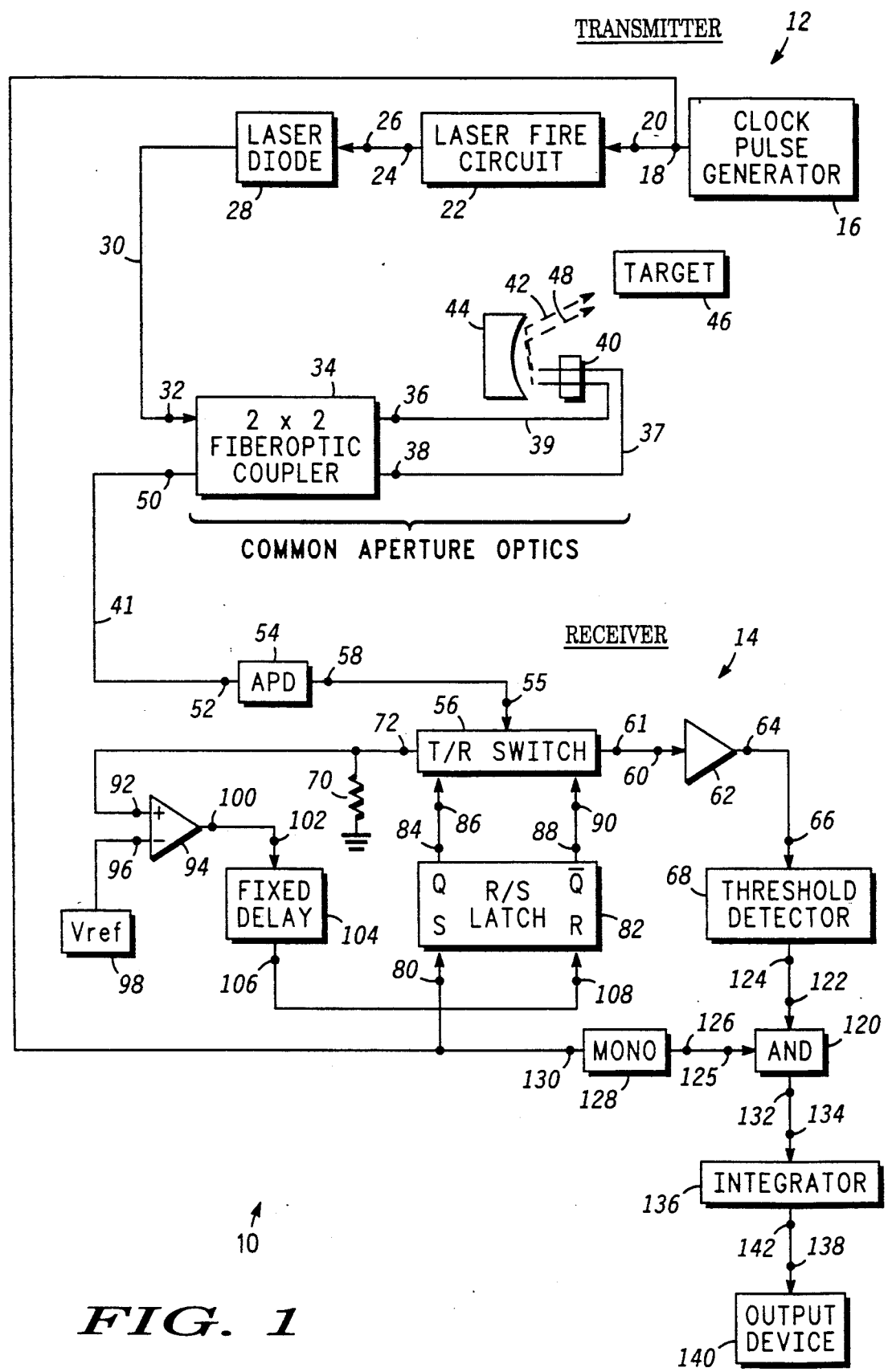
FIG. 1 is a block diagram of a single aperture optical range finder system employing the invention.

FIG. 1 shows the block diagram of a common aperture optical system 10 which has a transmitter portion 12 and a receiver portion 14. Transmitter 12 includes a clock pulse or transmitter trigger generator 16 having an output connected through node 18 to the control input terminal 20 of a narrow pulse, laser firing circuit 22. Output terminal 24 of circuit 22 is connected to terminal 26 of laser diode 28. The optical power from laser diode 28 is coupled through optical fiber 30 to an input port 32 of fiber optic coupler 34 which functions as a bidirectional coupler wherein energy introduced to port 32 is distributed between ports 36 and 38 thereof and reflected energy introduced at ports 36 and 38 is distributed between ports 32 and 50. Ports 36 and 38 of coupler 34 are coupled through optical fibers 37 and 39 and terminated at fiber optic manifold 40 which helps define the shape of the field or view of system 10.

In the transmit mode, the light beams 42, 48 originated by laser diode 28 are emitted from manifold 40 and reflected by spherical mirror 44 towards a target 46. Also a normally undesirable "backscatter" optical signal is reflected from coupler 34 and manifold 40 through optical fiber 41 to input terminal 52 of Avalanche Photo Detector (APD) 54 which changes light into an electrical control signal. Input terminal 55 of T/R switch 56 is connected between output terminal 58 of APD 54 and the input terminal 60 of transimpedance receiver amplifier 62. Output terminal 64 of amplifier 62 is connected to input terminal 66 of threshold detector 68.

During the transmit mode, amplifier 62 is isolated from the backscatter by T/R switch 56. During the receive mode, light power from target 46 is collected by mirror 44, focused onto fibers 37 and 39 and distributed through fiber optic coupler 34 to port 50 thereof which is connected to APD 54. T/R switch 56 applies the electrical output from APD 54 resulting from the reflected target signal to amplifier 62.

Common aperture optical system 10 uses the same optical elements 34, 37, 39, 40 and 44 for transmission and reception. Since both the transmit and receive fields of view are coincident, alignment between receiver 12 and transmitter 14 is maintained over all operating ranges by this technique. As a result, the background contribution and response to aerosol backscatter is minimized. Additionally, the surface area of the package for system 10 is minimized as a result of having a common "window" for both transmitter 12 and receiver 14. Since common optic fiber paths 37 and 39 are utilized by both transmitter 12 and receiver 14, it is important that the shape of the transmitted pulse from laser diode 28 be precisely controlled particularly when measuring ranges to close in targets at a distance of less than approximately 30 feet. This is necessary so that the transmitted light pulses do not interfere with or are not interfered with by the returning light pulses from target 46. System 10 therefore requires that laser diode 28 provide high power pulses each having fast rise and fall times of about a nanosecond, high repetition rates of 5 to 10 kilohertz, good conversion efficiency, and short durations of a few nanoseconds. Also receiver 62 must have sufficient sensitivity to detect weak reflected pulses from distant targets.

T/R switch 56 isolates receiver input stage 62 during the transmit interval from the high power transmitter pulses by providing a high impedance to stage 62 and by shunting the output signal of the APD 54 to resistive load 70 which is connected to output terminal 72 of T/R switch 56. This prevents or reduces receiver saturation caused by transmitter energy (backscatter reflected from the common aperture optics coincident with the transmission of outgoing pulses. T/R switch 56 also must connect receiver stage 62 to photodetector 54 in time to detect the reflected pulse from target 46. Hence, T/R switch 56 works best with rapid switching times of a about a nanosecond.

To provide these functions, transmit trigger node 18 is connected to the "set" input 80 of Reset-Ser (RS) latch 82. Qoutput terminal 84 of latch 82 is connected to control terminal 86 of T/R switch 56 and $\overline{Q}$ output terminal 88 is connected to control terminal 90 of T/R switch 56. Q and $\overline{Q}$ represent complementary digital signals. Output terminal 72 of T/R switch 56 is also connected to a first input terminal 92 of comparator 94. A second input terminal 96 of comparator 94 is adapted to receive a reference potential having a fixed magnitude of approximately 100 millivolts, for instance, from supply 98. Output terminal 100 of comparator 94 is connected to input terminal 102 of fixed delay circuit 104. Output terminal 106 of delay circuit 104 is connected to the "reset" input terminal 108 of latch 82.

AND gate 120 includes an input terminal 122 which is connected to output terminal 124 of threshold detector 68. Another input terminal 125 of AND gate 120 is connected to output terminal 126 of monostable multivibrator 128. Node 18 is connected to input terminal 130 of multivibrator 128. Output terminal 132 of AND gate 120 is connected to input terminal 134 of integrator 136. Input terminal 138 of output device 140 is connected to output terminal 142 of integrator 136.

Figure 2:
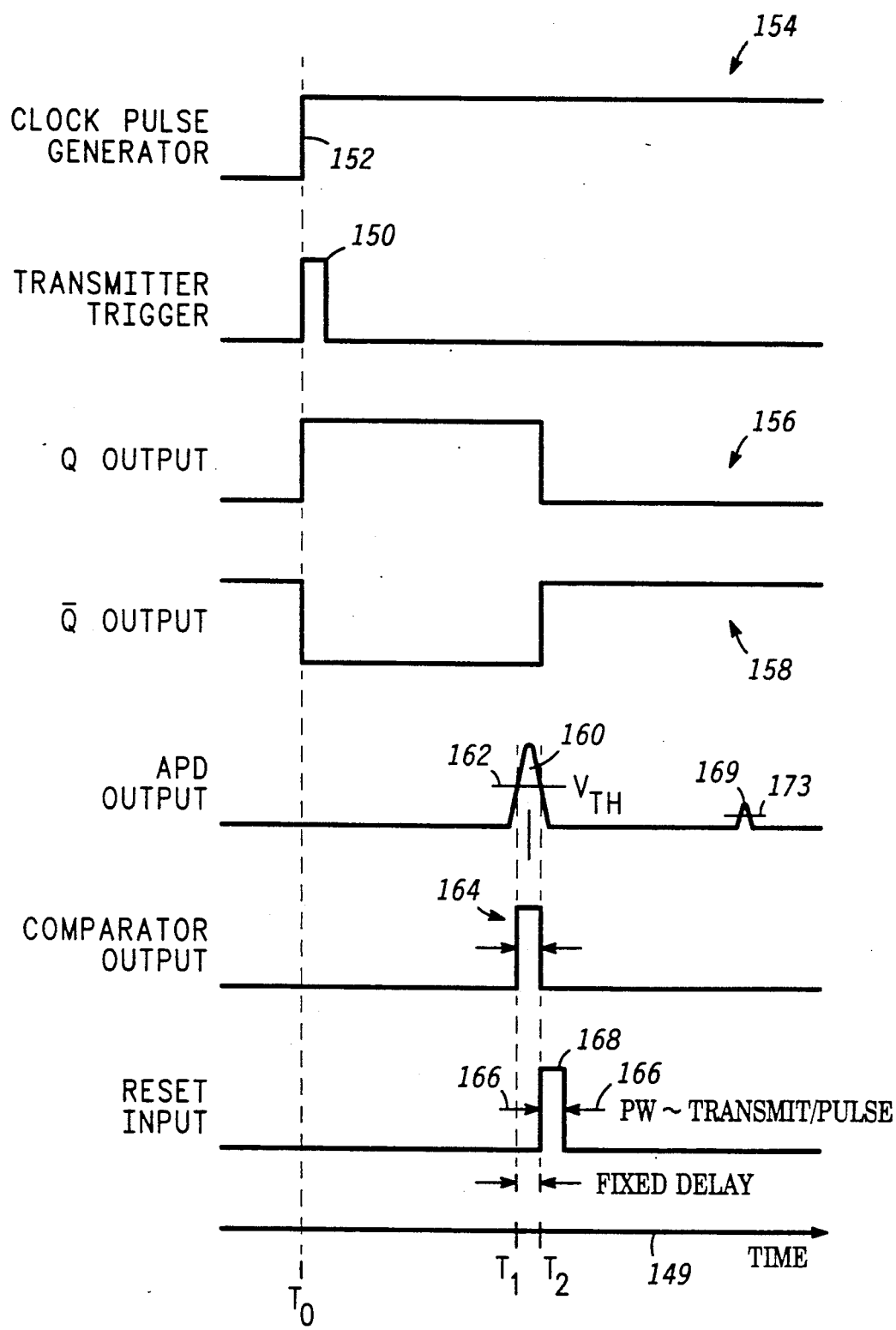
FIG. 2 shows waveforms illustrating the timing of signals of system of FIG. 1.

FIG. 2 shows a timing diagram for waveforms illustrating the operation of system 10 of FIG. 1. Time is indicated along horizontal axis 149. In operation, transmit trigger or initiation pulse 150 is provided by fire circuit 22 at time T0 by the leading edge 152 of the clock pulse 154 from clock pulse generator 16. Also clock pulse 154 sets RS latch 82 such that the Q signal 156 at output 86 goes high and the $\overline{Q}$ signal 158 at output 88 goes low. T/R switch 56 disconnects receiver amplifier 62 in response to $\overline{Q}$ being low. In response to Q being high, T/R switch 56 routes or shunts backscatter signal 160 from APD 54 to resistive load 70. The backscatter pulse 160 develops a signal across resistor 70 which increases in magnitude to exceed the threshold (Vth) 162 level at time T1. This causes voltage comparator 94 to switch and to provide an output signal 164 to delay circuit 104 which provides a signal 168 after a fixed delay period (PW) indicated by arrows 166. Signal 168 resets latch 82 at time T2. The delay period of circuit 104 is normally equal to the duration of the transmitter pulse. When latch 82 is reset, the Q output on terminal 84 goes low and the $\overline{Q}$ signal on output terminal 88 goes high. The high $\overline{Q}$ causes the T/R switch 56 to now connect the APD signal to the receiver allowing detection of the reflected return APD pulse 169 from a target. The low $\overline{Q}$ signal causes T/R switch 56 to disconnect the APD signal 169 from load 70. Pulses 150, 160, and 169 are consecutive signals.

Using the backscattered optical pulse 160 as a timing reference enables the operation of switch 56 to be independent of variations in the unpredictable delay of the transmitter firing circuitry 22 as represented by the time between trigger pulse 150 and backscatter pulse 160. These variations may be temperature and/or component induced. The compensation occurs because the backscatter signal 160 developed across resistor 70 results only after optical power has been developed and reflected back from the optical components at an effective range of zero. As a result, the fixed blanking interval between times T0 and T2 is set to achieve optimum in-range target detection without the elaborate temperature tracking circuitry required by some prior art embodiments.

Hence, circuitry 10 provides inherent transmitter delay compensation with a minimum of circuitry. Reflected transmitter energy 160 from the common aperture structure is used to accurately time the occurrence of the transmitted pulse. Also, the presence of the energy 160 is determined without use of an additional sensor for this purpose. Output terminal 72 of T/R switch 56 is used to shunt backscatter energy away from the receiving amplifier 62 and to provide electrical signal 160 which is substantially coincident with the transmitted pulse. Use of the normally undesirable occurrence of backscatter 160 enables system 10 to be viable.

At time T2, $\overline{Q}$ output waveform 158 goes high and Q output waveform 156 goes low as shown in FIG. 2. T/R switch 56 is then operated to connect T/R input terminal 55 to output terminal 61 and to isolate input terminal 55 from output terminal 72. Consequently, pulses 162 reflected from target 46 are isolated from comparator 94 but applied to receiver amplifier 62. When the reflected pulse magnitude becomes large enough to cross another predetermined threshold 173, then threshold detector 68 provides a detected output signal to input terminal 122 of AND gate 120 which operates as a coincidence detector. Assuming this detected pulse occurs during the time window initiated by clock pulse generator 16 and provided by monostable multivibrator 128, then a coincidence output signal is applied by AND gate 120 to integrator 136. After integrator 136 receives a predetermined number of coincidence signals from AND gate 120, then integrator 136 provides an integrated control signal to output device 140 which responds by activating an alarm or setting off a charge, for instance.

System 10 can be utilized for pulsed optical target detectors and pulsed radio frequency radar systems employing a common antenna or optical aperture for both transmitter and receiver in ranging applications. This includes, but is not limited to, microwave, optical, radio frequency, and sonic radar-type transceivers. Each of these systems employ T/R switches which must be synchronized with transmitter operation. Synchronization is crucial to proper performance especially in short distance flight ranging. The applications for system 10 can also be extended to circuits employing a common data transmission line in place of the common aperture optics 34, 37, 39, 40, and 44.

Figure 3:
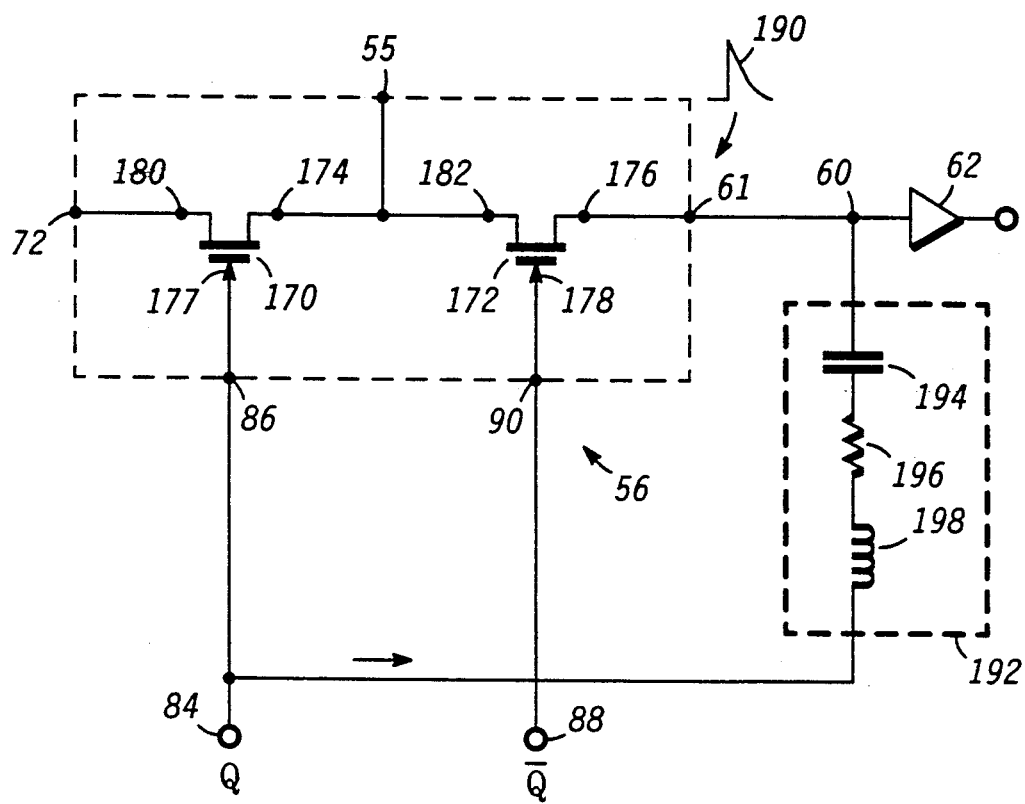
FIG. 3 is a schematic diagram of a compensated T/R switch.

T/R switch 56 can be implemented using monolithic microwave integrated technology (MMIC). FIG. 3 shows normally conductive field effect transistors (FETs) 170 and 172 having source electrodes 174, 176, gate electrodes 177, 178 and drain electrodes 180, 182. FET 170 operates as a shunt switch and FET 172 operates as a receiver switch. As previously explained, switch 56 is required to isolate the receiver amplifier 62 from terminal 55 during transmitter operation for preventing electrical saturation and overload. A non-ideal characteristic of switch 56 is feedthrough of transients from terminal 90 to terminal 61 during the transitions of control signal $\overline{Q}$. This is represented by an exponentially decaying waveform 190 at T/R switch terminal 61 which will occur at T2 in response to $\overline{Q}$ changing from a low to a high magnitude. Transient 190 is coupled by electrical capacitance or inductance in devices 170 and 172 and the package comprising MMIC switch 56. Transient 190 can cause electrical saturation and overload of amplifier 62. Saturation of amplifier 62 caused by the switching transient 90 will render system 10 blind to targets until the receiver 14 can recover.

To solve this problem, an external network 192 is connected between Q terminal 84 and input terminal 60. The network is designed to include capacitance 194, resistor 196, and/or inductor 198 that emulate and dominate the internal non-ideal capacitance, resistance or inductive components of switch 56 between control terminal 90 and output terminal 61. The result is that the transient normally generated at terminal 61 by the $\overline{Q}$ control signal is canceled by application of a complementary transient signal derived from the Q by network 192. Q changes from a high to a low magnitude at T2. The degree of cancellation is dependent on the accuracy which the non-ideal internal characteristics of switch 56 are emulated by network 192. In practice, satisfactory cancellation can be achieved in the time domain without an elaborate network. This is because the transients coupled in MMIC switches are often the result of a dominate term such as capacitance across the gate-to-source junction of the field effect transistors utilized in the device. The approach can thus often be implemented by series circuit 192. This superposition technique can be expanded to circuits with non-complementary control signals by providing an inverted cancellation signal using conventional circuit techniques.

While the invention has been described in conjunction with a specific embodiment thereof, it is evident that many alterations, modifications and variations will be apparent to those skilled in the art in light of the foregoing description. Accordingly, the invention is intended to include all such alterations, modifications and variations in the appended claims.

We claim:

1. A system for use in connection with target ranging, comprising:
   generator means for producing an energy pulse for illuminating a target in response to a trigger signal;
   radiator means for directing the illuminating energy pulse produced by the generator means toward the target and receiving a reflected energy pulse from the target;
   receiver means for detecting the reflected energy pulse;
   energy transfer means having at least three ports, a generator port coupled to the generator means, a radiator port coupled to the radiator means and a receiver port coupled to the receiver means, wherein the energy transfer means transfers illuminating energy from the generator port to the radiator port and reflected energy from the radiator port to the receiver port and a small backscatter portion of the illuminating energy pulse from the generator port to the receiver port substantially time coincident with the illuminating energy pulse;

switching means between the receiver port and the receiver means for transferring energy from the energy transfer means to a dissipative load when in a first state or from the energy transfer means to the receiver means when in a second state;

control means, responsive to the trigger signal and the time coincident backscatter energy, for controlling the switching means so as to maintain the switching means in the first state while significant time coincident backscatter energy exists and thereafter change the switching means to the second state.

2. The system of claim 1 wherein the control means comprises a comparator, a delay means and a latch serially coupled between the dissipative load and the switching means for providing a predetermined delay after which the switching means is switched from the first to the second state.

3. The system of claim 2 wherein the receiver comprises threshold detector means for detecting when the reflected energy is above a predetermined level, and a gate responsive to the trigger signal and the reflected energy for passing a signal proportional to the reflected energy to an integrator.

4. The system of claim 1 wherein the illuminating energy pulse is optical and the reflected energy pulse is converted from an optical to an electrical signal by converter means interposed between the energy transfer means and the switching means; and the switching means, control means and receiver means process electrical signals.

5. The system of claim 1 further comprising transient compensation means coupled between the control means and the receiver means for substantially canceling switching transients reaching the receiver means from the control means through the switching means.

6. The system of claim 1 wherein the control means provides first and second out of phase signals for controlling the switching means, wherein the first signal switches a portion of the switching means coupling the energy transfer means to the receiver means and the second signal switches a portion of the switching means coupling the energy transfer means to the dissipative load.

7. The system of claim 6 further comprising network means coupled between the receiver means and an output of the control means providing the second signal, for delivering to the receiver means a signal derived from the second signal which is substantially opposite in phase and amplitude to a portion of the first signal reaching the receiver means.

8. A transmitter-receiver system for use in ranging which is automatically compensated for time variations between transmit triggering and transmit energy pulse termination, comprising:

a triggered energy transmitter for illuminating a target with an outgoing energy pulse passed through a bidirectional transfer means internal to the system;

an energy receiver for detecting a returning energy pulse passing through the bidirectional transfer means after reflection from the target following illumination by the outgoing energy pulse;

the bidirectional transfer means for passing the outgoing energy pulse from the transmitter toward the target and the returning energy pulse from the target to a port of the bidirectional transfer means coupled to the receiver, wherein the bidirectional transfer means produces a spurious energy pulse at the port substantially time coincident with the outgoing energy pulse;

a control means for controlling the destination of energy appearing at the port, and responsive to a signal triggering the energy transmitter and to the time coincident spurious energy;

a switch having an input coupled to the port and an output coupled to the receiver, wherein the switch is non-conductive when the triggering signal and the time coincident spurious energy are both present and conductive after the spurious energy has fallen below a predetermined level.

9. The system of claim 8 wherein the outgoing and returning energy are optical and the bidirectional transfer means is an optical bidirectional coupler, and wherein an optical-to-electrical converter is provided to convert optical energy appearing at the port to electrical energy for transmission to the switch.

10. The system of claim 8 further comprising transient compensation means for substantially canceling switching transients reaching the receiver from the control means.

11. The system of claim 8 wherein the control means provides first and second out of phase signals for controlling the switch, wherein the first signal connects and disconnects the port to the receiver and the second signal causes dissipation of the spurious energy.

12. The system of claim 11 further comprising network means coupled between the receiver and an output of the control means providing the second signal, for delivering to the receiver a signal derived from the second signal which is substantially opposite in phase and amplitude to a portion of the first signal reaching the receiver.

13. A transmitter-receiver system for use in ranging which is automatically compensated for time variations between transmit triggering and transmit energy pulse termination, comprising:

a triggered energy transmitter for illuminating a target with an outgoing energy pulse passed through a bidirectional transfer means internal to the system;

an energy receiver for detecting a returning energy pulse passing through the bidirectional transfer means after reflection from the target following illumination by the outgoing energy pulse;

the bidirectional transfer means for passing the outgoing energy pulse from the transmitter toward the target and the returning energy pulse from the target to a port of the bidirectional transfer means coupled to the receiver, wherein the bidirectional transfer means produces a spurious energy pulse at the port substantially time coincident with the outgoing energy pulse;

a control means for controlling the destination of energy appearing at the port, and responsive to a signal triggering the energy transmitter and to the time coincident spurious energy;

a switch having an input coupled to the port and an output coupled to the receiver through a first path, wherein the first path is non-conductive when the triggering signal and the time coincident spurious energy are both present and conductive after the spurious energy has fallen below a predetermined level, wherein the control means is responsive to an electrical signal derived from the time coincident spurious energy and transmitted to the control means through a second path of the switch having an input coupled to the port and an output coupled to the control means.

14. The system of claim 13 wherein the control means comprises a comparator for comparing to a predetermined threshold an electrical signal passed through the second path of the switch and derived from the time coincident spurious energy, wherein the output of the comparator is used to determined when the first path of the switch changes from non-conductive to conductive.

15. A synchronous receiver system which is automatically compensated for time variations between first pulse triggering and first pulse termination and operating in the presence of a spurious signal substantially time coincident with the first pulse, wherein a second, weaker, delayed pulse and the spurious substantially time coincident signal make up portions of a time varying composite signal, comprising:
 a detector for detecting when the spurious signal exceeds a predetermined threshold;
 means for amplifying the second pulse;
 a switch preceding the amplifying means for receiving the time varying composite signal and having a first output coupled to the amplifying means;
 a latch responsive to the detector for controlling the switch to direct the second pulse portion of the composite signal through the switch to the amplifying means when the spurious signal portion of the composite signal is not present and causing the spurious signal portion of the composite signal to be dissipated when it is present.

16. The system of claim 15 wherein the switch has a second output coupled to the detector and wherein the detector receives the spurious signal portion of the composite signal through the switch.

17. The system of claim 16 wherein a signal which triggers the first pulse sets the latch so that the switch directs the spurious signal portion of the composite signal to the detector.

18. The system of claim 17 wherein the detector, on receipt of the spurious signal portion of the composite signal, initiates a predetermined time delay after which the latch resets, and the switch changes state to direct the second pulse portion of the composite signal to the amplifying means.

19. The system of claim 15 further comprising means coupled to the latch and the amplifying means for substantially canceling feed-through to the amplifying means of a switching control signal delivered to the switch from the latch.

* * * * *